Patented Feb. 20, 1940

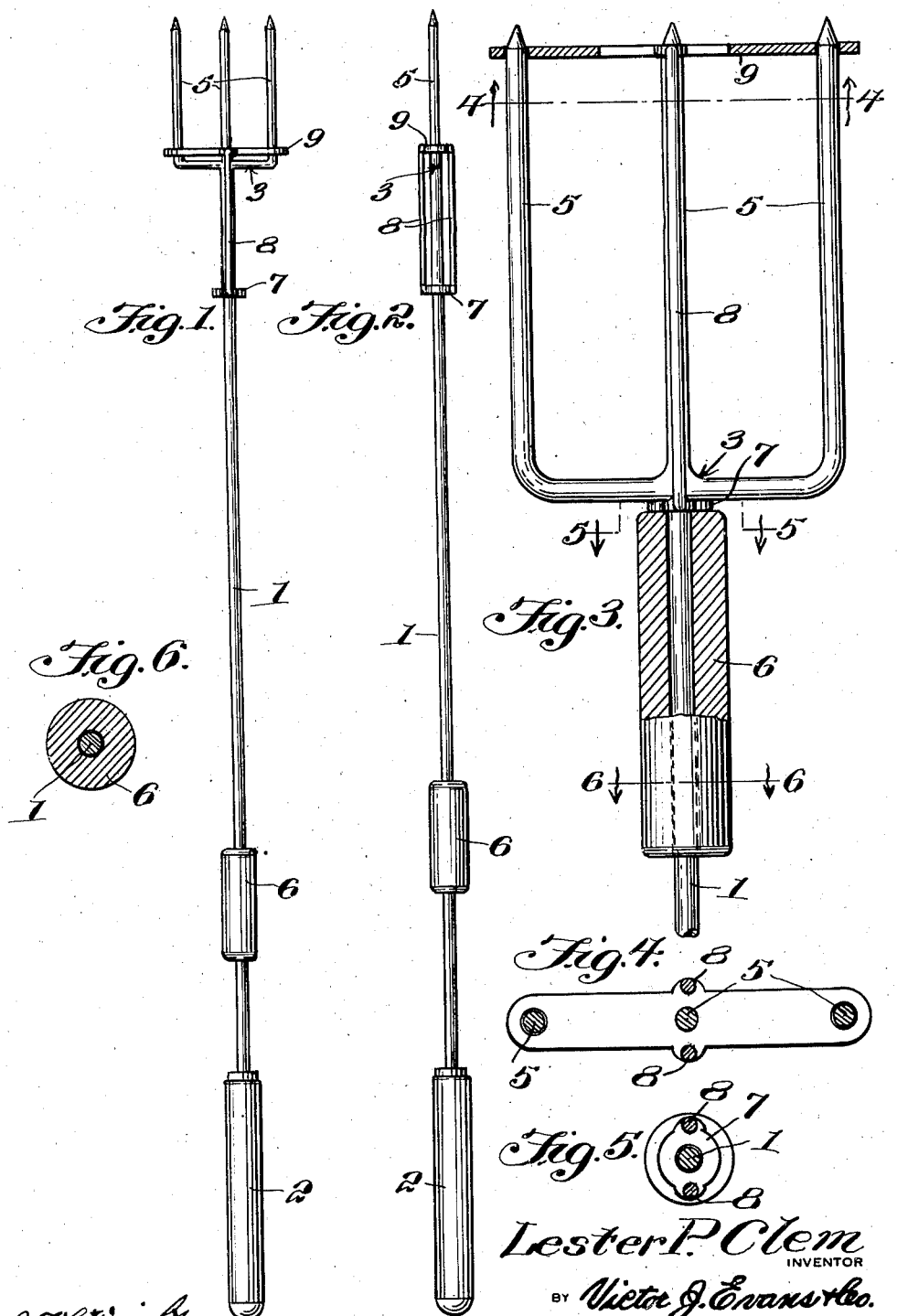

2,191,226

UNITED STATES PATENT OFFICE 2,191,226

ROASTING FORK

Lester P. Clem, Muskogee, Okla.

Application June 21, 1937, Serial No. 149,495

2 Claims. (Cl. 53—5)

This invention relates to roasting forks and has for the primary object the provision of an efficient and inexpensive device of this character which will permit a person to roast over a fire weiners and other foods without danger of being burnt or having to stand so close to the fire to be made uncomfortable by the heat and which will permit the weiner to be rotated while roasting and having means for removing the weiner without bringing the hands in contact therewith.

With these and other objects in view, this invention consists in certain novel features of construction, combination and arrangement of parts to be hereinafter more fully described and claimed.

For a complete understanding of my invention, reference is to be had to the following description and accompanying drawing, in which Figure 1 is a plan view illustrating a roasting fork constructed in accordance with my invention.

Figure 2 is an edge elevation illustrating the same.

Figure 3 is a fragmentary plan view, partly in section, showing the means for removing a weiner or the like from the fork.

Figure 4 is a sectional view taken on the line 4—4 of Figure 3.

Figure 5 is a sectional view taken on the line 5—5 of Figure 3.

Figure 6 is a sectional view taken on the line 6—6 of Figure 3.

Referring in detail to the drawing, the numeral 1 indicates a rod of a selected length and has fixed to one end a handle 2 and formed on the opposite end is a fork head 3 including relatively spaced tines 5. The tines are sharpened at the free end to facilitate the penetration of the tines through a weiner or the like.

A hand grip 6 is rotatably and slidably mounted on the rod. Also slidable on the rod is a collar 7 having formed integrally therewith connecting elements 8. Said elements 8 are secured on a plate 9. The plate 9 is provided with openings to slidably receive the tines and acts as an ejector for removing a weiner from the tines.

In use, the device is held by a person by clasping the handle 2 in one hand and the hand grip 6 in the other. A weiner mounted on the tines may then be placed in close contact with the fire for the purpose of roasting the weiner. The person gripping the device as described can then readily rotate the weiner so as to bring about thorough roasting thereof. The ejector plate 9 is located in close proximity to the forked head while roasting the weiner and when it is desired to remove the roasted weiner from the tines the hand grip is moved endwise of the rod, imparting a movement to the ejector plate 9 which in turn shoves the weiner off of the tines.

What is claimed is:

1. A roasting fork comprising a rod, a handle secured to one end of said rod, a hand grip rotatably and slidably mounted on the rod, a forked head formed on the other end of said rod and including spaced tines for penetrating a food product, and an ejector plate slidable on said tines, connecting members secured to said plate, and a collar connecting said connecting members and slidable on said rod to be engaged by the hand grip for moving the ejector plate towards the free ends of the tines to remove the food product from the tines.

2. A roasting fork comprising a rod, a hand grip rotatably and slidably mounted on the rod, a forked head formed on one end of the said rod and including spaced tines for penetrating a food product, an ejector plate slidable on said tines, connecting members secured to said plate, and a collar connecting said connecting members and slidable on said rod to be engaged by the hand grip for moving the ejector plate toward the free end of the tines to remove the food product from the said tines.

LESTER P. CLEM.